United States Patent
Isshiki

(10) Patent No.: US 10,211,986 B2
(45) Date of Patent: Feb. 19, 2019

(54) PROGRAM COLLATION SYSTEM, NODE, COLLATION METHOD, AND COMPUTER-READABLE MEDIUM

(71) Applicant: NEC CORPORATION, Tokyo (JP)

(72) Inventor: Toshiyuki Isshiki, Tokyo (JP)

(73) Assignee: NEC CORPORATION, Tokyo (JP)

(*) Notice: Subject to any disclaimer, the term of this patent is extended or adjusted under 35 U.S.C. 154(b) by 26 days.

(21) Appl. No.: 14/889,031

(22) PCT Filed: May 14, 2014

(86) PCT No.: PCT/JP2014/062815
§ 371 (c)(1),
(2) Date: Nov. 4, 2015

(87) PCT Pub. No.: WO2014/185447
PCT Pub. Date: Nov. 20, 2014

(65) Prior Publication Data
US 2016/0099807 A1    Apr. 7, 2016

(30) Foreign Application Priority Data
May 15, 2013  (JP) ................................ 2013-102956

(51) Int. Cl.
*H04L 29/06* (2006.01)
*H04L 9/32* (2006.01)
(Continued)

(52) U.S. Cl.
CPC ............... *H04L 9/32* (2013.01); *G06F 21/31* (2013.01); *H04L 9/008* (2013.01); *H04L 9/3271* (2013.01)

(58) Field of Classification Search
CPC ............ H04L 63/00; G06F 21/60; H04N 7/00
See application file for complete search history.

(56) References Cited

U.S. PATENT DOCUMENTS 9,436,835 B1 * 9/2016 Saldamli ............... G06F 21/602
2009/0006855 A1   1/2009 Tuyls et al.
(Continued)

FOREIGN PATENT DOCUMENTS

JP    2006-158851    6/2006
JP    2008-521025    6/2008
(Continued)

OTHER PUBLICATIONS

International Search Report, PCT/JP2014/062815, dated Aug. 12, 2014.
(Continued)

*Primary Examiner* — Joseph P Hirl
*Assistant Examiner* — Leynna T Truvan
(74) *Attorney, Agent, or Firm* — Young & Thompson

(57) ABSTRACT

A collation system includes first through third nodes N1-N3. N1 includes: an evaluation formula generation unit generating an evaluation formula evaluating a distance with authentication data; an encryption unit encrypting coefficients of the evaluation formula by a public key and transmitting the encrypted coefficients to N3; and an evaluation value generation unit acquiring the encrypted coefficients from N3 when authentication target data to be collated with the authentication data is received, generating an evaluation value collating the authentication target data with the authentication data based on the authentication target data and the encrypted coefficients, and transmitting the evaluation value to N2. N2 includes: a key generation unit generating a public/secret key pair and transmitting the public key to N1; and a collation unit decrypting the evaluation value using the secret key, thereby collating the authentication target data with the authentication data. N3 includes a storage unit holding the encrypted coefficients.

14 Claims, 7 Drawing Sheets

(51) Int. Cl.
*G06F 21/31* (2013.01)
*H04L 9/00* (2006.01)

(56) References Cited

U.S. PATENT DOCUMENTS

| | | |
|---|---|---|
| 2009/0310779 A1 | 12/2009 | Lam et al. |
| 2011/0194691 A1* | 8/2011 | Rane .............. H04L 9/008 380/255 |
| 2012/0207299 A1 | 8/2012 | Hattori et al. |
| 2013/0212645 A1 | 8/2013 | Takahashi |

FOREIGN PATENT DOCUMENTS

| | | |
|---|---|---|
| WO | WO 2011/052056 | 5/2011 |
| WO | WO 2012/056582 | 5/2012 |

OTHER PUBLICATIONS

Shahandashti et al., "Private Fingerprint Matching", ACISP2012, p. 1-14.

* cited by examiner

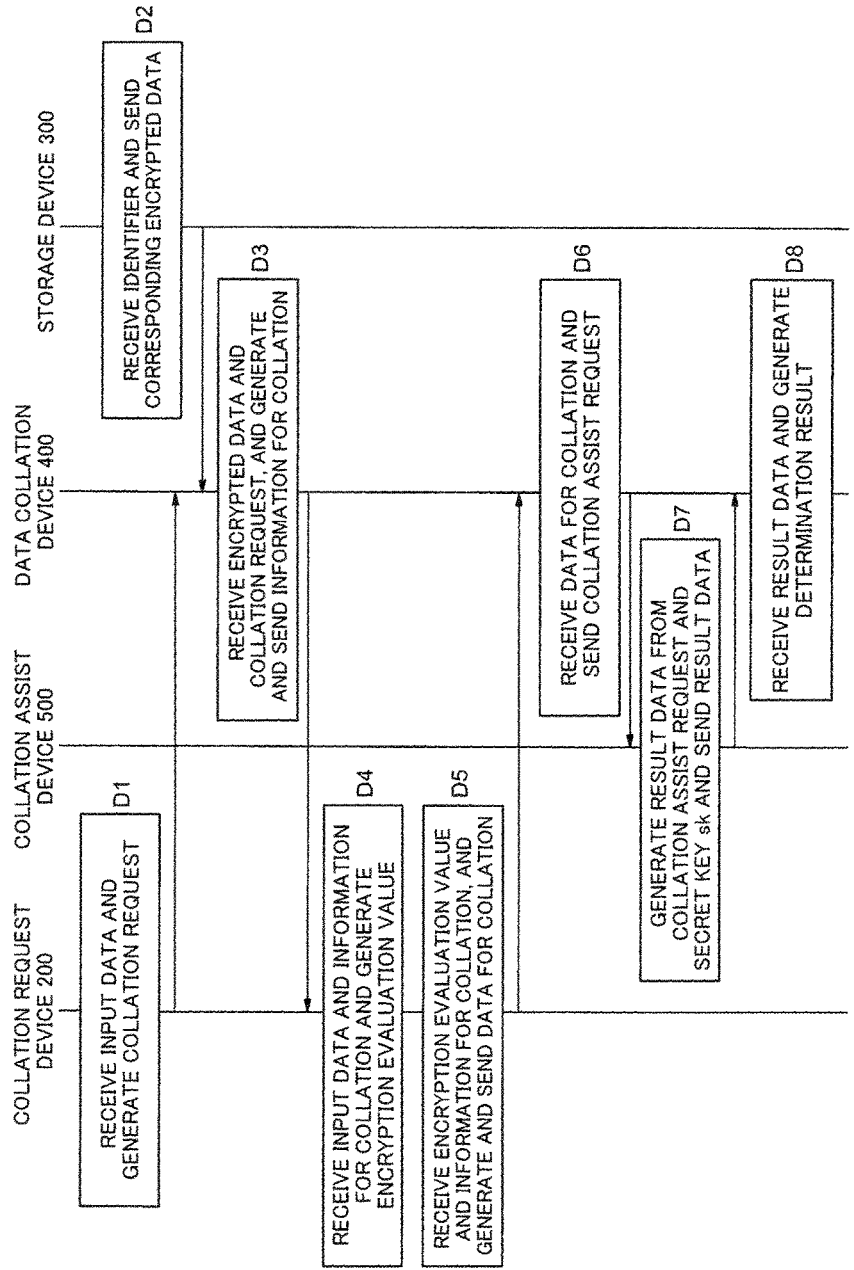

PROGRAM COLLATION SYSTEM, NODE, COLLATION METHOD, AND COMPUTER-READABLE MEDIUM

CROSS-REFERENCE TO RELATED APPLICATIONS

The present invention is based on Japanese Patent Application No. 2013-102956 (filed on May 15, 2013), the entire contents of which are incorporated herein by reference.

The present invention relates to a collation system, a node, a collation method, and a computer-readable medium, and more particularly, to a collation system that permits ambiguity of data to be collated, a node, a collation system, and a computer-readable medium.

TECHNICAL FIELD

Background Art

In recent years, with the spread of a cloud computing, a service, which is provided using data of a user accumulated in computer resources connected to a network, is rapidly prevailing. In such a service, an opportunity of treating sensitive data of a user is increasing. Consequently, it is important to guarantee safe management of user's data.

Under such a situation, research and development have been actively conducted for a technology of managing data an encrypted state in an open network environment and executing retrieval, statistical processing and the like without decrypting the data.

Furthermore, in recent years, since crimes having exploited vulnerability of personal authentication using a password and a magnetic card frequently occur, a biometric authentication technology with higher safety based on biometric features such as a fingerprint and a vein has been spotlighted.

In biometric authentication, in order to verify authentication information, it is necessary to keep templates regarding biometric information in a database. Since biometric information such as a fingerprint and a vein is basically unchangeable throughout the life and great damage occurs when the information is leaked, high confidentiality is required.

Therefore, a template protection type biometric authentication technology, in which template information is authenticated while keeping the template information secret such that "impersonation" can be prevented even though templates are leaked, has become important.

For example, Patent Literature 1 discloses a scheme in which fingerprint data is expressed as points on a polynomial, random points are added to the points, and biometric authentication is performed employing data keeping the secrecy of the fingerprint data as templates.

Furthermore, Non-Patent Literature 1 discloses a scheme in which biometric information of a client requesting authentication is protected using public key encryption having homomorphism.

Patent Literature

Patent Literature 1: Japanese Unexamined Patent Application Publication No. 2006-158851

Non-Patent Literature

Non-Patent Literature 1: Siamak F. Shahandashti, Reihaneh Safavi-Naini, and Philip Ogunbona, "Private Fingerprint Matching", ACISP 2012.

SUMMARY OF INVENTION

Technical Problem

It is assumed that the entire disclosure contents of the aforementioned Patent Literature and Non-Patent Literature are incorporated herein by reference. The following analysis has been made by the present inventor.

The scheme of Patent Literature 1 has been known that biometric information may not be protected with sufficient strength when biometric authentication has been repeated any number of times.

On the other hand, Non-Patent Literature 1 proposes the scheme in which biometric information of a client requesting authentication is protected using public key encryption having homomorphism.

In a biometric authentication scheme not protecting biometric information, a feature point called a minutia is extracted from the biometric information (for example, a fingerprint and the like), and the minutia is registered in a server as a template for authentication. In general, the minutia includes three components of a type, a coordinate (x, y), and an angle. The type indicates a type of a feature point, and for example, is an endpoint, a branch point and the like. The coordinate indicates a coordinate of the feature point, and the angle indicates a slope of a tangent at the feature point.

The server confirms that the minutia extracted from the biometric information of the client during authentication and the minutia registered as the template for authentication coincide with each other. When satisfying three conditions of (1) the types of feature points coincide with each other, (2) a distance between the feature points is within a threshold value, and (3) a difference of slopes of tangents at the feature points is within the threshold value, it is regarded that the minutia have coincided with each other.

In detail, in the case in which the minutia extracted during authentication is defined as (type 1, (x1,y1), θ1) and the registered minutia is defined as (type 2, (x2,y2), θ2), when satisfying three conditions of $$\text{type 1}=\text{type 2}, \tag{1}$$

$$0\leq((x1-x2)^2+(y1-y2)^2)\leq \delta d, \text{ and} \tag{2}$$

$$0\leq(\theta 1-\theta 2)^2\leq \delta t, \tag{3}$$

it is regarded that the two minutia have coincided with each other.

Herein, δd and δt are parameters decided by a system. Furthermore, a distance evaluated in (2) is called a two-dimensional Euclid distance or a L2 norm. Similarly, a distance evaluated in (3) is called a one-dimensional Euclid distance. Hereinafter, these are collectively called a Euclid distance and a Euclid distance of D and D' is expressed by d (D, D').

Non-Patent Literature 1 discloses a biometric authentication scheme capable of concealing the biometric information of the client requesting authentication. In detail, an encryption protocol called Aided Computation and Set Intersection is used. By this encryption protocol, it is possible to confirm whether the minutia (type 2, (x2,y2), θ2) registered in the server and the minutia (type 1, (x1,y1), θ1) extracted during authentication coincide with each other without revealing the minutia (type 1, (x1,y1), θ1) to the server.

Hereinafter, data registered in a server in advance from a client will be referred to as "authentication data". Furthermore, data extracted during authentication and to be collated with the authentication data will be referred to as "authentication target data". In the aforementioned example, the minutia (type 2, (x2,y2), θ2) corresponds to the authentication data and the minutia (type 1, (x1,y1), θ1) corresponds to the authentication target data.

As preparation to describe these encryption protocols, public key encryption will be described. The public key encryption includes three algorithms of key generation, encryption, and decryption. The key generation is a probabilistic algorithm that receives a security parameter as input and outputs a public key pk and a secret key sk. The Encryption is a probabilistic algorithm that receives the public key pk and a message M as input and outputs a ciphertext C. The decryption is a deterministic algorithm that receives the secret key sk and the ciphertext C as input and outputs a decryption result M.

Hereinafter, the key generation, the encryption, and the decryption algorithms are written as follows.

Key generation: $KeyGen(1^k) \rightarrow (pk, sk)$

Encryption: $Enc(pk, M) \rightarrow C$

Decryption: $Dec(sk, C) \rightarrow M$

The case in which the public key encryption scheme has homomorphism indicates the case in which the following Equation is satisfied with respect to certain operations (*) and (+).

$Enc(pk, M1(+)M2) = Enc(pk, M1)(*)Enc(pk, M2)$

For example, Paillier encryption has been known as public key encryption having homomorphism in which (*) and (+) have been respectively employed as multiplication and addition. Next, the Paillier encryption will be described.

Key generation: receive security parameter $1^k$.

Randomly select prime numbers p and q of k bits and set n to be equal to pq.

Next, g is assumed to be $1+n \bmod n^2$.

Output public key pk=(n,g) and secret key sk=(p,q).

Encryption: receive pk=(n,g) and message m as input.

Randomly select r from $Z^*\_\{n^2\}$.

Calculate $C = (1+mn) \cdot r^n \bmod n^2$.

Output ciphertext C.

Decryption: receive sk=(p,q) and ciphertext C as input.

Calculate $\lambda = (p-1)(q-1)$.

Calculate $m = (c^{\{\lambda\}} \bmod n^2 - 1)/(g^{\{\lambda\}} \bmod n^2 - 1) \bmod n$.

Output plaintext m.

When $C1 = Enc(pk, m1) = (1+m1 \, n) \cdot r1^n \bmod n^2$ and $C2 = Enc(pk, m2) = (1+m2n) \cdot r2^n \bmod n^2$, since $C1 \times C2 = (1+(m1+m2)n + m1 \cdot m2 \cdot n^2) \cdot (r1r2)^n \bmod n^2 = (1+(m1+m2)n) \cdot (r1r2)^n \bmod n^2 = Enc(pk, m1+m2)$, the Paillier encryption has homomorphism. As described above, the public key encryption capable of performing addition of a plaintext in an encrypted state is called additive homomorphism public key encryption.

Set Intersection is an encryption protocol performed between Alice and Bob which are entities of two persons. It is assumed that the Alice has data a and the Bob has an aggregation B of data. At this time, the Set Intersection is a protocol for confirming whether the data a is included in the aggregation B in a state in which the data a of the Alice has been kept secret to the Bob.

For the purpose of simplification, the Set Intersection will be described using the aggregation B={b1,b2,b3}. Furthermore, it is assumed that the Bob opens the public key pk of the additive homomorphism public key encryption and holds the corresponding secret key sk.

1. The Bob generates a polynomial F(x) having a value of 0 when x=b1,b2,b3 and values other than 0 in other cases. For example, it is sufficient if F(x)=(x−b1)(x−b2)(x−b3). Such a polynomial can be easily generated using Lagrange interpolation. Herein, it is assumed that coefficients of F(x) are α[0], α[1], . . . , α[n]. That is, $F(x) = \alpha[n]x^n + \alpha[n-1]x^{\{n-1\}} + \ldots + \alpha[1]x + \alpha[0]$.

2. The Bob respectively encrypts α[0], α[1], . . . , α[n] by using the public key pk. Furthermore, the Bob sends a ciphertext C[0], C[1], . . . , C[n] to the Alice.

3. The Alice calculates $a^{\{n\}}, a^{\{n-1\}}, \ldots, a^{\{0\}}$. Moreover, the Alice calculates $C[n]^{\{a^{\{n\}}\}}, C[n-1]^{\{a^{\{n-1\}}\}}, \ldots, C[0]^{\{a^{\{0\}}\}}$.

4. The Alice calculates $C = C[n]^{\{a^{\{n\}}\}} \cdot C[n-1]^{\{a^{\{n-1\}}\}}, \ldots, C[0]^{\{a^{\{0\}}\}}$. By homomorphism, C=Enc (pk,F(a)). Furthermore, the Alice randomly selects r and sets C' as $C^{\{r\}}$. Moreover, the Alice sends C' to the Bob.

5. The Bob decrypts the received C'. When the decryption result is 0, the Bob determines that the Alice has data included in the aggregation B, and when the decryption result is not 0, the Bob determines that the Alice does not have the data included in the aggregation B.

For the purpose of simplification, a protocol of the Set Intersection by the Alice having input a and the Bob having the aggregation B and the secret key sk is written as Set Intersection [Alice (a), Bob (B,sk)](pk). Herein, pk indicates the public key pk which is common input to the Alice and the Bob.

Next, Aided Computation will be described. The Aided Computation is also an encryption protocol performed between the Alice and the Bob which are entities of two persons. It is assumed that the Alice has a ciphertext Enc(pk,a) of the data a and the Bob has an aggregation B of data and the secret key sk corresponding to the public key pk. Encryption of the Bob is the additive homomorphism public key encryption. At this time, the Aided Computation is a protocol for confirming whether the data a is included in the aggregation B in a state in which the data a of the Alice has been kept secret to the Bob. The Aided Computation is different from the Set Intersection and the Alice does not know the plaintext of the data a.

For the purpose of simplification, the Aided Computation will be described using B={b1,b2,b3}. Furthermore, it is assumed that the polynomial F(x) having a value of 0 when x=b1,b2,b3 and values other than 0 in other cases has been opened. That is, it is assumed that $F(x) = \alpha[n]x^n + \alpha[n-1]x^{\{n-1\}} + \ldots + \alpha[1]x + \alpha[0]$ and α[0] to α[n] have been opened.

1. The Alice randomly selects r, calculates $Enc(pk, ra) = \{Enc(pk, a)\}^{\{r\}}$, and sends Enc(pk,ra) to the Bob.

2. The Bob decrypts Enc(pk,ra) to obtain ra.

3. The Bob calculates $(ra)^{\{\alpha[1]\}}, (ra)^{\{\alpha[2]\}}, \ldots, (ra)^{\{\alpha[n]\}}$ and respectively encrypts them by using the public key pk. That is, the Bob performs $C[i] = Enc(pk, (ra)^{\{\alpha[i]\}})$ with respect to i=1 to n and sends C[1] to C[n] to the Alice.

4. The Alice calculates $C'[i] = (C[i])^{\{1/(r^{\{i\}})\}}$ with respect to i=1 to n.

5. The Alice calculates $C = C'[1] \cdot C'[2] \ldots C'[n] \cdot Enc(pk, \alpha[0])$ and sends it to the Bob. By homomorphism, C=Enc(pk, F(a)).

6. The Bob decrypts C. When the decryption result is 0, the Bob determines that the Alice has a ciphertext of data included in the aggregation B, and when the decryption result is not 0, the Bob determines that the Alice does not have the ciphertext of the data included in the aggregation B.

For the purpose of simplification, a protocol of the Aided Computation for the function F(x) by the Alice having input Enc(pk,a) and the Bob having the aggregation B and the secret key sk is written as Aided Computation [Alice Enc (pk,a), Bob (B,sk)](pk,F(x)). Herein, pk indicates the public key pk which is common input to the Alice and the Bob.

In Non-Patent Literature 1, the Set Intersection and the Aided Computation are used in order to confirm that the minutia (type 1, (x1,y1), θ1) (authentication target data) of the client and the template (type 2, (x2,y2), θ2) (authentication data) for authentication held in the server coincide with each other. In detail, the following processing is performed.

(1) Coincidence of type: perform Set Intersection [client (type 1), server (type2,sk)](pk).

(2) Coincidence of distance: firstly calculate Euclid distance between (x1,y1) and (x2,y2) in an encrypted state.

(i) The server generates F(x) by employing B={0, 1, . . . , δd}.

(ii) The server respectively calculates $Enc(pk,x2^2)$, $Enc(pk,x2)$, $Enc(pk,y2^2)$, and $Enc(pk,y2)$, and sends them to the client.

(iii) The client calculates $Enc(pk,x1^2)$ and $Enc(pk,y1^2)$.

(iv) The client calculates $Enc(pk,x1^2) \cdot \{Enc(pk,x2)\}^{\{-2x1\}} \cdot Enc(pk,x2^2) \cdot Enc(pk,y1^2) \cdot \{Enc(pk,y2)\}^{\{-2y1\}} \cdot Enc(pk,y2^2) = Enc(pk,(x1-x2)^2+(y1-y2)^2)$.

(v) Perform Aided Computation[client $(Enc(pk,(x1-x2)^2+(y1-y2)^2))$,server $(\{0, 1, \ldots \delta d\},sk)](pk,F(x))$.

(3) Coincidence of angle: similarly to the coincidence of distance, calculate $Enc(pk,(\theta 1-\theta 2)^2)$, and perform Aided Computation[client $(Enc(pk,(\theta 1-\theta 2)^2))$,server (B',sk)](pk,G (x)) for G(x) corresponding to B'={0, 1, . . . , δt}.

However, according to the technology disclosed in Non-Patent Literature 1, since the server (the authentication side node) needs to perform decryption of data sent from the client (the authentication side target node) and re-encryption of a decryption result for each collation, there is a problem that the load of the server (the authentication side node) during collation is large.

Therefore, it is desired to reduce the processing load of the authentication side node during collation of a ciphertext. An object of the present invention is to provide a collation system, a node, a collation method, and a computer-readable medium, which contribute to such desire.

A collation system according to a first aspect of the present invention includes a first node, a second node and a third node. The first node includes: an evaluation formula generation unit that generates an evaluation formula for evaluating a distance with authentication data; an encryption unit that encrypts coefficients of the evaluation formula by a public key and transmits the encrypted coefficients to the third node; and an evaluation value generation unit that acquires the encrypted coefficients from the third node when authentication target data to be collated with the authentication data is received, generates an evaluation value for collating the authentication target data with the authentication data based on the authentication target data and the encrypted coefficients, and transmits the evaluation value to the second node. The second node includes: a key generation unit that generates a pair of the public key and a secret key and transmits the public key to the first node; and a collation unit that decrypts the evaluation value by using the secret key, thereby collating the authentication target data with the authentication data. The third node includes a storage unit that holds the encrypted coefficients.

A node according to a second aspect of the present invention includes: an evaluation formula generation unit that generates an evaluation formula for evaluating a distance with authentication data; an encryption unit that encrypts coefficients of the evaluation formula by a public key received from a second node that generates a pair of the public key and a secret key, and transmits the encrypted coefficients to a third node; and an evaluation value generation unit that acquires the encrypted coefficients from the third node when authentication target data to be collated with the authentication data is received, generates an evaluation value for collating the authentication target data with the authentication data based on the authentication target data and the encrypted coefficients, and transmits the evaluation value to the second node.

In a collation method according to a third aspect of the present invention, a first node generates an evaluation formula for evaluating a distance with authentication data; the first node encrypts coefficients of the evaluation formula by a public key received from a second node that generates a pair of the public key and a secret key, and transmits the encrypted coefficients to a third node; the first node acquires the encrypted coefficients from the third node when authentication target data to be collated with the authentication data is received, and generates an evaluation value for collating the authentication target data with the authentication data based on the authentication target data and the encrypted coefficients; and the first node transmits the evaluation value to the second node.

A non-transitory computer-readable medium storing a program according to a fourth aspect of the present invention, the program causes a computer in a first node to execute:

a process of generating an evaluation formula for evaluating a distance with authentication data;

a process of encrypting coefficients of the evaluation formula by a public key received from a second node that generates a pair of the public key and a secret key, and transmitting the encrypted coefficients to a third node;

a process of acquiring the encrypted coefficients from the third node when authentication target data to be collated with the authentication data is received, and generating an evaluation value for collating the authentication target data with the authentication data base on the authentication target data and the encrypted coefficients; and a process of transmitting the evaluation value to the second node.

In addition, the program can be provided as a program product recorded on a non-transitory computer-readable storage medium.

Advantageous Effects of Invention

In accordance with a collation system, a node, a collation method, and a computer-readable medium according to the present invention, it is possible to reduce the processing load of an authentication side node during collation of a ciphertext.

BRIEF DESCRIPTION OF DRAWINGS

FIG. 7 is a sequence diagram illustrating a ciphertext collation operation of a collation system according to a third exemplary embodiment as an example.

DESCRIPTION OF EMBODIMENTS

Figure 1:
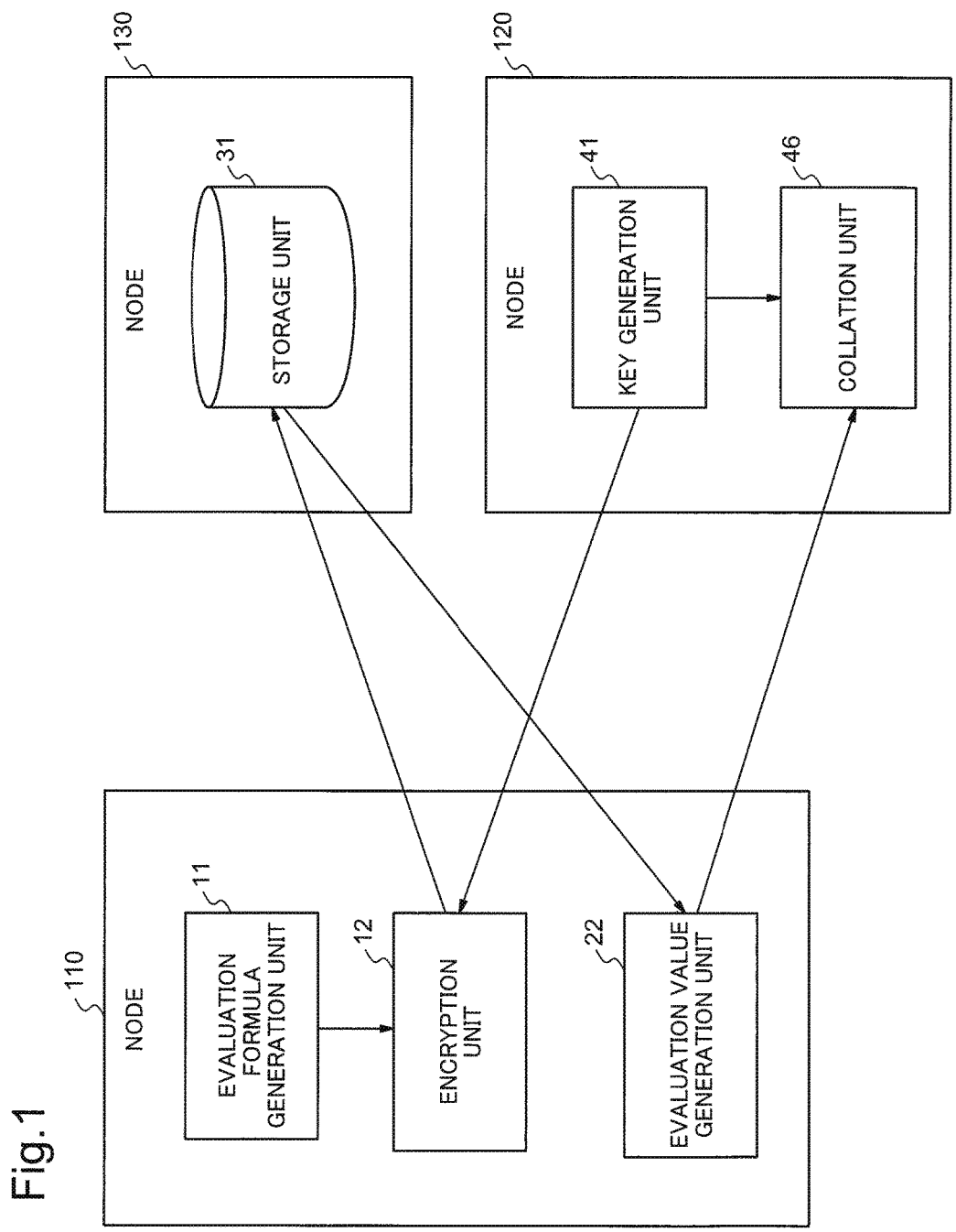
FIG. 1 is a block diagram illustrating a configuration of a collation system according to an exemplary embodiment as an example.

Firstly, the overview of an exemplary embodiment will be described. In addition, reference numerals supplemented to the overview are examples for only understanding, and are not intended to limit the present invention to the illustrated exemplary embodiment.

FIG. 1 is a block diagram illustrating a configuration of a collation system according to an exemplary embodiment as an example. Referring to FIG. 1, the collation system includes a first node 110 as an authentication side target node, and includes a second node 120 and a third node 300 as an authentication side node. The first node 110 has an evaluation formula generation unit 11, an encryption unit 12, and an evaluation value generation unit 22. On the other hand, the second node 120 has a key generation unit 41 and a collation unit 46. Furthermore, the third node 130 has a storage unit 31.

The evaluation formula generation unit 11 of the first node 110 generates an evaluation formula for evaluating a distance with authentication data. The key generation unit 41 of the second node 120 generates a pair of a public key and a secret key and transmits the public key to the first node 110. The encryption unit 12 of the first node 110 encrypts coefficients of the evaluation formula by the public key and transmits the encrypted coefficients to the third node 130. The storage unit 31 of the third node 130 holds the encrypted coefficients.

When authentication target data to be collated with authentication data is received, the evaluation value generation unit 22 of the first node 110 acquires the encrypted coefficients from the third node 130, generates an evaluation value for collating the authentication target data with the authentication data based on the authentication target data and the encrypted coefficients, and transmits the evaluation value to the second node 120. The collation unit 46 of the second node 120 decrypts the evaluation value by using the secret key, thereby collating the authentication target data with the authentication data.

Herein, preferably, the encryption unit 12 performs encryption based on an encryption scheme having additive homomorphism. As an example, the encryption unit 12 may also perform the encryption based on Paillier encryption.

The evaluation formula generation unit 11 may also generate a polynomial, which has a value of 0 when a distance with the authentication data is within a predetermined distance, as an evaluation formula. When the polynomial is a polynomial of the $N^{th}$ degree in which an coefficient of an $i^{th}$ term is $\alpha[i] (i=0, 1, \ldots, N)$, the encryption unit 12 may also encrypt the coefficient $\alpha[i]$ by the public key to obtain the encrypted coefficient $C[i]$, and transmit the encrypted coefficient $C[i]$ to the third node 130. At this time, when authentication target data D' is received, the evaluation value generation unit 22 preferably acquires the encrypted coefficient $C[i]$ from the third node 130 and generates $C[N]t^{\{D'^N\}} \cdot C[N-1]^{\{D'^{\{N-1\}}\}} \ldots C[1]^{D'} \cdot C[0]$ as the aforementioned evaluation value.

Furthermore, the collation unit 46 may also collate the authentication target data with the authentication data based on whether a value obtained by encrypting the evaluation value by using the secret key is 0.

Moreover, the authentication data and the authentication target data may also include an n-dimensional element. At this time, the evaluation formula generation unit 11 may also generate a polynomial, which has a value of 0 when an n-dimensional Euclid distance between the authentication target data and the authentication data is within a predetermined distance, as the aforementioned evaluation formula.

Furthermore, the authentication data and the authentication target data may also include a plurality of elements. At this time, preferably, the evaluation formula generation unit 11 obtains polynomials, which have a value of 0 when a distance between the authentication target data and the authentication data is within a predetermined distance, with respect to the plurality of elements, and generates the sum of the polynomials obtained with respect to the plurality of elements as the aforementioned evaluation formula.

According to the technology disclosed in Non-Patent Literature 1, since the server needs to perform decryption of data sent from the client and re-encryption of a decryption result for each collation, there is a problem that the load of the server (the authentication side node) in collation is large.

In accordance with the collation system according to the aforementioned exemplary embodiment, the first node 110 (the authentication side target node) generates information regarding an evaluation formula required in collation, other than data or a ciphertext of the data, and registers the information in the third node 130 (included in the authentication side node) during data registration, so that the aforementioned problem is solved. Furthermore, an encryption scheme to be used is allowed to have a special property of homomorphism, so that it is possible to calculate a Euclid distance of data in an encrypted state, thereby guaranteeing that it is possible to collate encrypted data without decrypting the encrypted data.

In accordance with the collation system, since the amount of processing performed by the second node 120 and the third node 300 included in the authentication side node is small, a collation process is performed at a high speed. Furthermore, in accordance with the collation system, it is easy to perform parallel processing, so that it is possible to simultaneously cope with many collation requests. The reason for this is because information required in collation is generated by the first node 110 (the authentication side target node) and is registered in the third node 130 during data registration.

Exemplary Embodiment 1

Next, a collation system according to a first exemplary embodiment will be described in detail with reference to the drawings.

Figure 2:
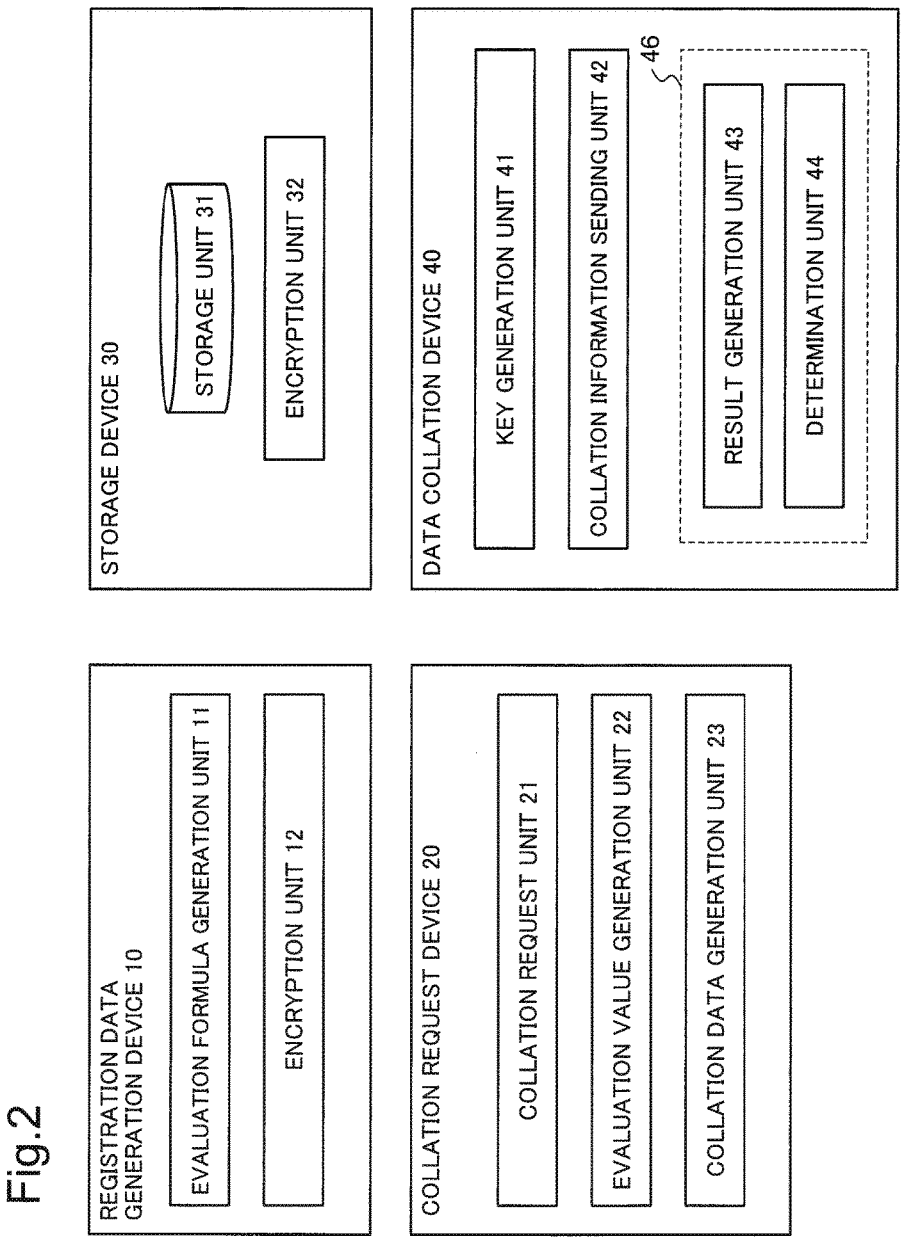
FIG. 2 is a block diagram illustrating a configuration of a collation system according to a first exemplary embodiment as an example.

FIG. 2 is a block diagram illustrating a configuration of a collation system according to the present exemplary embodiment as an example. Referring to FIG. 2, the collation system includes a registration data generation device 10, a collation request device 20, a storage device 30, and a data collation device 40.

In addition, FIG. 2 illustrates the case in which the collation system is configured by four nodes; however, the collation system of the present invention is not limited to the illustrated exemplary embodiment. As an example, the registration data generation device 10 and the collation request device 20 may also be collectively employed as a first node, the data collation device 40 may also be employed as a second node, and the storage device 30 may also be employed as a third node.

The registration data generation device 10 includes an evaluation formula generation unit 11 and an encryption unit 12.

The evaluation formula generation unit 11 employs authentication data to be concealed and a parameter as input, and generates an evaluation formula. The encryption unit 12 employs the authentication data, the evaluation formula, and an encryption key opened by the data collation device 40 as input, and outputs encrypted data.

The storage device 30 includes a storage unit 31 and an identifier management unit 32. The storage unit 31 stores the encrypted data sent from the registration data generation device 10 and a unique identifier assigned by the identifier management unit 32.

The collation request device 20 includes a collation request unit 21, an evaluation value generation unit 22, and a collation data generation unit 23.

The collation request unit 21 receives authentication target data to be collated with authentication data and sends a collation request to the data collation device 40. The evaluation value generation unit 22 employs the authentication target data and information for collation received from the data collation device 40 as input, and generates an encryption evaluation value. The collation data generation unit 23 employs the encryption evaluation value as input, and generates data for collation.

The data collation device 40 includes a key generation unit 41, a collation information sending unit 42, a result generation unit 43, and a determination unit 44.

The key generation unit 41 generates a public key and a secret key of public key encryption, opens the public key, and holds the secret key. The collation information sending unit 42 receives the collation request sent from the collation request device 20 as input, and sends the information for collation. The result generation unit 43 employs the data for collation sent from the collation request device 20 and the secret key as input, and outputs result data. The determination unit 44 receives the result data as input, and generates and outputs a collation result.

Next, an operation of the collation system according to the present exemplary embodiment will be described in detail with reference to the drawings.

The operation of the collation system is classified into two phases of a data registration phase and a ciphertext collation phase. In the data registration phase, authentication data is input to the registration data generation device 10, is encrypted, and is registered in the storage device 30. On the other hand, in the ciphertext collation phase, the authentication target data input to the collation request device 20 is being kept secret and it is determined whether the authentication target data is approximate to (that is, the Euclid distance is short) the plaintext of the encrypted data stored in the storage device 30.

Hereinafter, an operation in each phase will be described in detail.

[Data Registration Phase]

Figure 3:
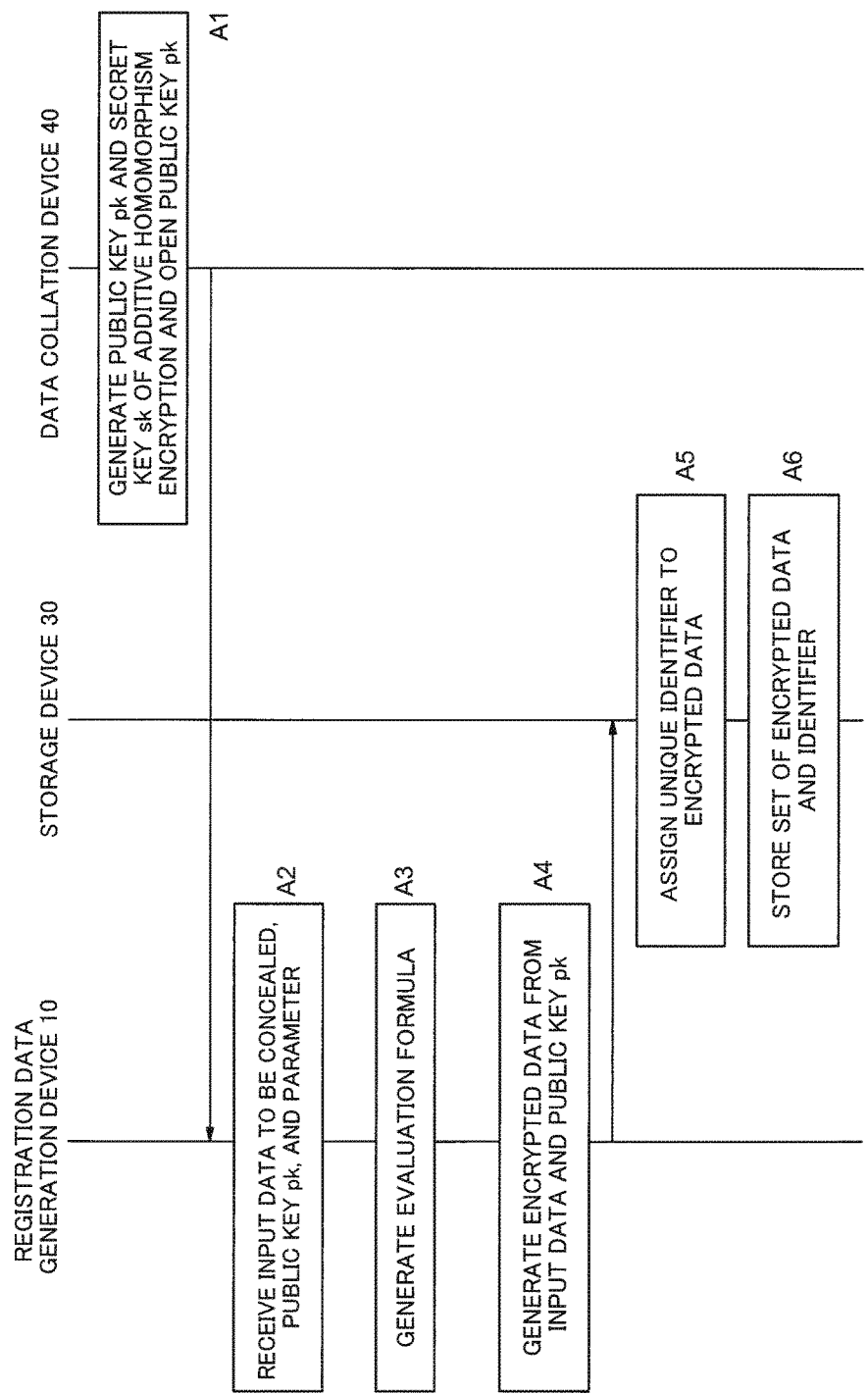
FIG. 3 is a sequence diagram illustrating a data registration operation of a collation system according to a first exemplary embodiment as an example.

FIG. 3 is a sequence diagram illustrating an operation in the data registration phase of the collation system according to the present exemplary embodiment as an example.

Referring to FIG. 3, the key generation unit 41 of the data collation device 40 generates the public key and the secret key of additive homomorphism encryption and opens the public key (step A1).

Next, the registration data generation device 10 receives authentication data to be concealed, the public key, and the parameter (step A2).

Next, the evaluation formula generation unit 11 of the registration data generation device 10 generates an evaluation formula from the input authentication data and parameter (step A3).

Next, the encryption unit 12 of the registration data generation device 10 generates encrypted data from the evaluation formula and the public key, and sends the encrypted data to the storage device 30 (step A4).

When the encrypted data is received, the identifier management unit 32 of the storage device 30 assigns a unique identifier to the encrypted data (step A5). Furthermore, the identifier management unit 32 stores a set of the encrypted data and the identifier in the storage unit 31 (step A6).

[Ciphertext Collation Phase]

Figure 4:
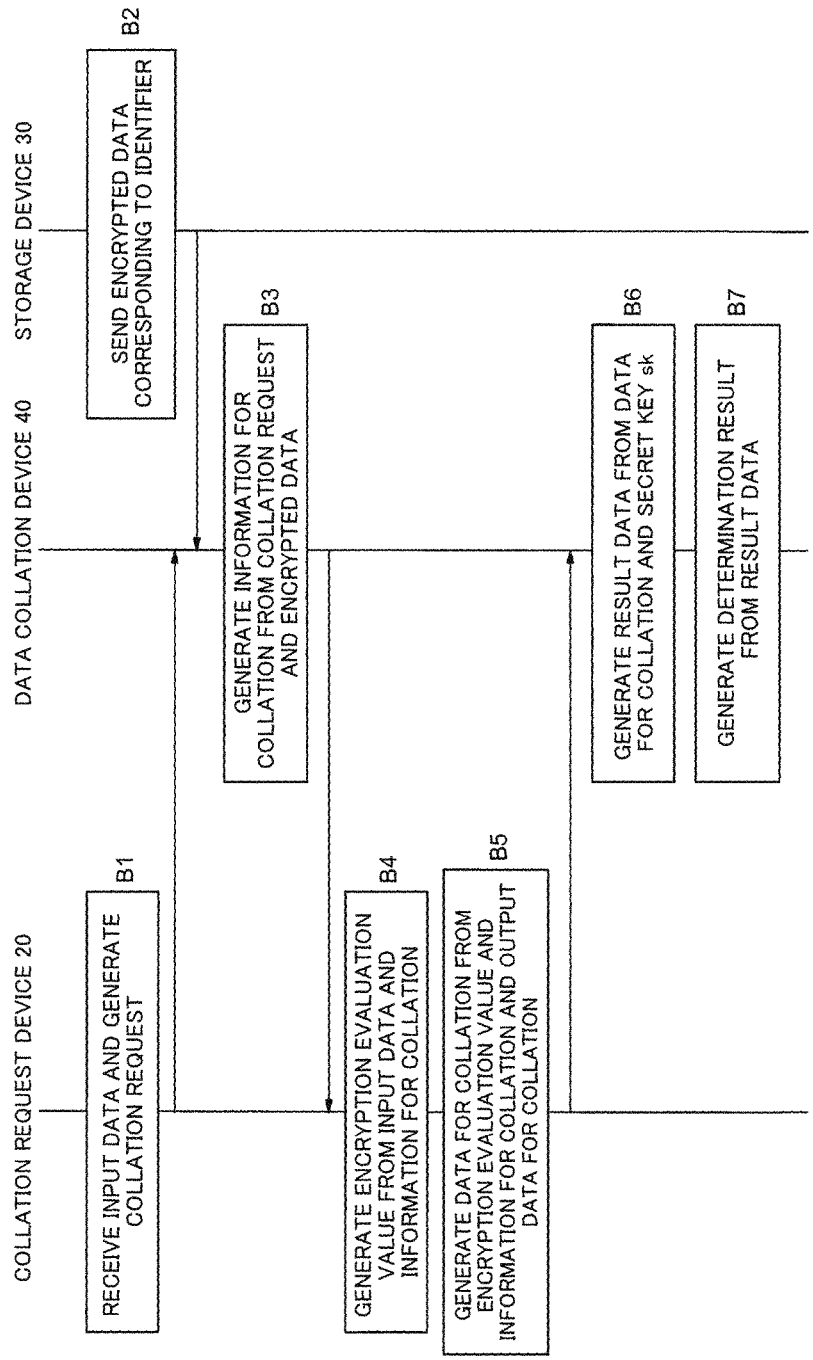
FIG. 4 is a sequence diagram illustrating a ciphertext collation operation of a collation system according to a first exemplary embodiment as an example.

FIG. 4 is a sequence diagram illustrating an operation in the ciphertext collation phase of the collation system according to the aforementioned exemplary embodiment as an example.

Referring to FIG. 4, the collation request unit 21 of the collation request device 20 receives the authentication target data and outputs a collation request (step B1).

Next, when the identifier and the collation request are received, the collation information sending unit 42 of the data collation device 40 receives encrypted data corresponding to the identifier from the storage device 30 (step B2), and outputs information for collation (step B3).

When the information for collation is received, the evaluation value generation unit 22 of the collation request device 20 calculates an evaluation formula and outputs an encryption evaluation value (step B4).

When the encryption evaluation value and the information for collation are received, the collation data generation unit 23 generates data for collation and outputs the data for collation to the data collation device 40 (step B5).

When the data for collation and the secret key are received, the result generation unit 43 of the data collation device 40 generates result data (step B6).

When the result data is received, the determination unit 44 generates and outputs a determination result (step B7).

In the collation system according to the present exemplary embodiment, the registration data generation device 10 generates information regarding an evaluation formula required in collation, other than data or a ciphertext of the data, and registers the information in the storage device 30 during data registration. In accordance with the collation system, it is possible to reduce the processing load of the data collation device 40 constituting an authentication side node as compared with the processing load of a server disclosed in Non-Patent Literature 1.

Exemplary Embodiment 2

Next, a collation system according to a second exemplary embodiment will be described in detail with reference to the drawings.

In the present exemplary embodiment, in the collation system according to the first exemplary embodiment, a one-dimensional Euclid distance is used as a distance. That is, when a distance d $(D,D')=(D-D')^{\{2\}}$ between authentication data D and authentication target data D' is equal to or less than a threshold value d, it is determined that the authentication data D and the authentication target data D' have matched with each other. On the other hand, when the distance d $(D,D')=(D-D')^{\{2\}}$ is larger than the threshold value d, it is determined that the authentication data D and the authentication target data D' do not match with each other. Furthermore, in the present exemplary embodiment, additive homomorphism encryption (for example, Paillier encryption and the like) is used. Hereinafter, an operation in each phase will be described in detail with reference to FIG. 3 and FIG. 4.

[Data Registration Phase]

Referring to FIG. 3, the key generation unit 41 of the data collation device 40 generates a public key pk and a secret key sk of additive homomorphism encryption and opens the public key pk (step A1).

Next, the registration data generation device 10 receives authentication data D to be concealed, and the public key pk generated by the key generation unit 41 (step A2).

Next, the evaluation formula generation unit 11 of the registration data generation device 10 randomly generates a polynomial F(x), which is equal to 0 when $(D-x)^2=0$, 1, . . . , d and is not equal to 0 in other cases, from the input authentication data D and a parameter d (step A3).

For example, since $F(x)=(D-x)^2\cdot((D-x)^2-1)\cdot((D-x)^2-2)$ . . . $((D-x)^2-d)$ is a polynomial of the 2d+2 degree, F(x) is equal to 0 when $(D-x)^2=0, 1, \ldots, d$ and is not equal to 0 in other cases. For the purpose of simplification, it is assumed that $F(x)=\alpha[N]x^{n\{N\}}+\alpha[N-1]x^{\{N-1\}}+ \ldots +\alpha[0]$. In the aforementioned example, since F(x) is the polynomial of the 2d+2 degree, N=2d+1.

Next, the encryption unit 12 employs the public key pk and the coefficients of the polynomial F(x) as input, generates encrypted data C={Enc(pk, $\alpha[0]$), Enc(pk, $\alpha[1]$), . . . , Enc(pk, $\alpha[N]$)}, and sends the encrypted data to the storage device 30 (step A4).

When the encrypted data is received, the identifier management unit 32 of the storage device 30 assigns a unique identifier ID to the encrypted data (step A5). Furthermore, the identifier management unit 32 stores a set (C,ID) of the encrypted data and the identifier in the storage unit 31 (step A6).

[Ciphertext Collation Phase]

Referring to FIG. 4, the data collation device 40 receives the set (C,ID) of the encrypted data stored in the storage unit 301 and the identifier corresponding to the encrypted data (step B2).

When the authentication target data D' and the public key pk are received, the collation request unit 21 of the collation request device 20 generates a collation request req and outputs the collation request req to the data collation device 40 (step B1). The collation request req is a message requesting collation.

Herein, the data collation device 40 receives the set of the encrypted data and the identifier (step B2). It will be appreciated that the collation request req includes the identifier ID and the data collation device 40 may also be configured to receive a ciphertext C corresponding to the identifier ID from the storage device 30.

When the collation request is received, the collation information sending unit 42 of the data collation device 40 outputs information C for collation to the collation request device 20 (step B3). In the present exemplary embodiment, the information for collation is assumed to be registered encrypted data C. It will be appreciated that the information for collation may also include necessary information (for example, a session ID and the like) in addition to the encrypted data C.

When the information C for collation is received, the evaluation value generation unit 22 of the collation request device 20 calculates an encryption evaluation value as follows (step B4).

1. The evaluation value generation unit 22 sets V=Enc(pk,$\alpha[N])^{\{D'^{\{N\}}\}}\cdot$Enc(pk, $\alpha[N-1])^{\{D'^{\{N-1\}}\}}$ . . . Enc(pk, $\alpha[0]$).

2. The evaluation value generation unit 22 selects a random number r and sets res=$V^{\{r\}}$.

When the encryption evaluation value res and the information for collation are received, the collation data generation unit 23 generates data res for collation and outputs the data res for collation to the data collation device 40 (step B5).

Herein, the data for collation is the encryption evaluation value res calculated in step B4. It will be appreciated that the data for collation may also include necessary information (for example, a session ID and the like) in addition to the encryption evaluation value res.

Furthermore, step B4 is performed in order to allow output when d(D,D')<d to be randomly performed. When it is not necessary to allow the output to be randomly performed, step B4 may also be omitted.

When the data res for collation and the secret key sk are received, the result generation unit 43 of the data collation device 40 decrypts the data res for collation and obtains result data RESULT as a decryption result (step B6).

When the result data RESULT is received, the determination unit 44 determines that d(D,D')≤d if RESULT=0, and determines that d(D,D')>d in other cases (step B7).

In the present exemplary embodiment, authentication data registered in the storage device 30 is encrypted data. Furthermore, all data sent from the collation request device 20 in the collation phase is a ciphertext. Consequently, information regarding the registered authentication data D and the authentication target data D' is not absolutely leaked to the storage device 30.

Furthermore, in the present exemplary embodiment, an example of a one-dimensional Euclid distance has been described. However, the polynomial F(x) is changed, so that the present invention can also be easily applied to a two or more-dimensional Euclid distance.

Moreover, the present invention can also be easily applied to the case in which the authentication data D includes a plurality of elements. For example, in the case in which D=(Dx,Dy) and it is determined whether d(Dx,Dx')≤dx and d(Dy,Dy')≤dy, it is sufficient if a polynomial f(x) is set to 0 when x satisfies d(Dx,x)≤dx and is set not to 0 in other cases, and a polynomial g(y) is set to 0 when y satisfies d(Dy,y)≤dy and is set not to 0 in other cases, so that F(x,y)=f(x)+g(y).

In the collation system according to the present exemplary embodiment, the registration data generation device 10 generates information regarding an evaluation formula required in collation, instead of registering data or a ciphertext of the data, and registers the information in the storage device 30 during data registration. In accordance with the collation system, it is possible to reduce the processing load of the data collation device 40 constituting an authentication side node as compared with the processing load of a server disclosed in Non-Patent Literature 1.

Exemplary Embodiment 3

Next, a collation system according to a third exemplary embodiment will be described in detail with reference to the drawings.

Figure 5:
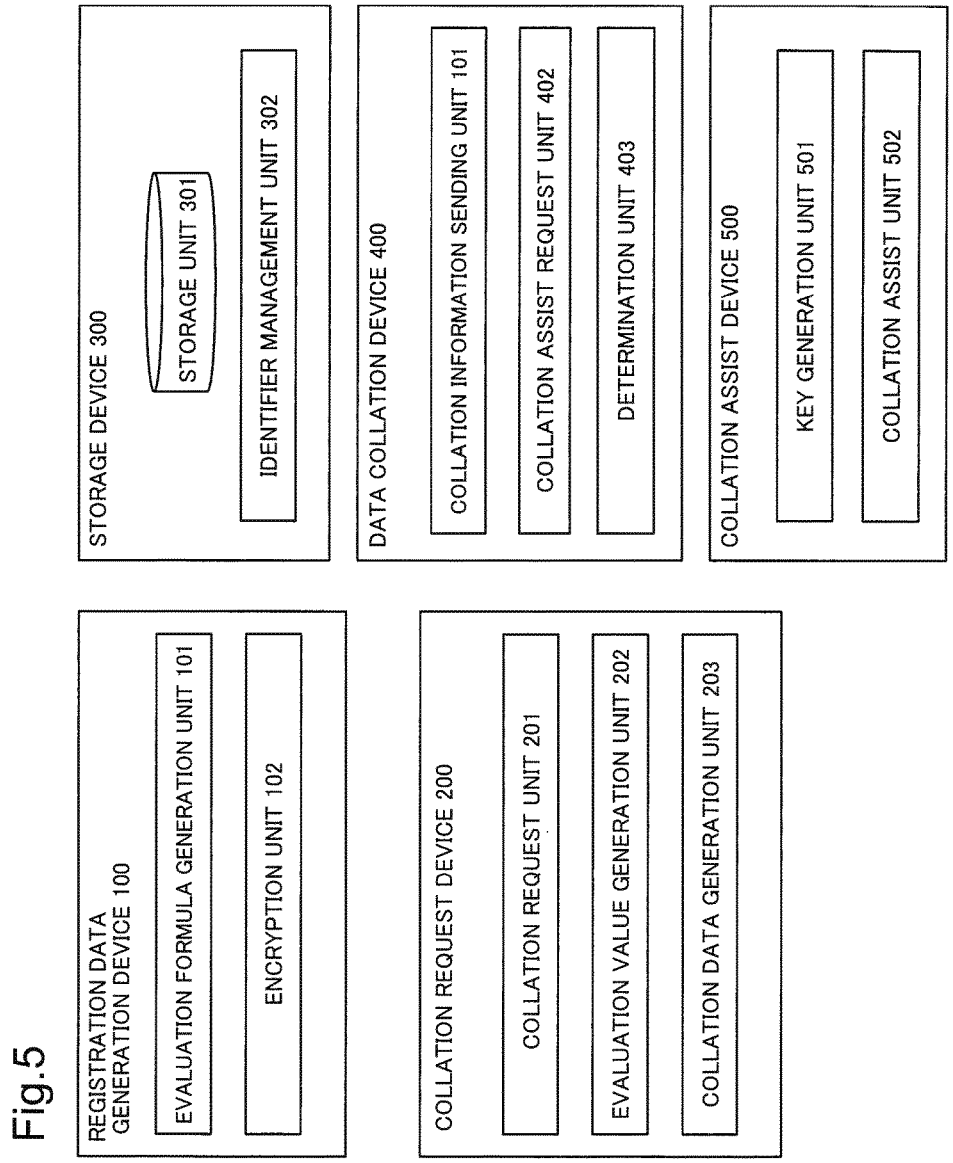
FIG. 5 is a block diagram illustrating a configuration of a collation system according to a third exemplary embodiment as an example.

FIG. 5 is a block diagram illustrating a configuration of a collation system according to the present exemplary embodiment as an example. Referring to FIG. 5, the collation system includes a registration data generation device 100, a collation request device 200, a storage device 300, a data collation device 400, and a collation assist device 500.

In addition, FIG. 5 illustrates the case in which the collation system is configured by five nodes; however, the collation system of the present invention is not limited to the illustrated exemplary embodiment. As an example, the registration data generation device 100 and the collation request device 200 may also be collectively employed as a first node, the collation assist device 500 may also be employed as a second node, and the storage device 300 and the data collation device 400 may also be collectively employed as a third node.

The registration data generation device 100 includes an evaluation formula generation unit 101 and an encryption unit 102. The evaluation formula generation unit 101 employs authentication data to be concealed and a parameter as input, and generates an evaluation formula. The encryption unit 102 employs the authentication data, the evaluation formula, and an encryption key opened by the collation assist device 500 as input, and outputs encrypted data.

The storage device 300 includes a storage unit 301 and an identifier management unit 302. The storage unit 301 stores the encrypted data sent from the registration data generation device 100 and a unique identifier assigned by the identifier management unit 302.

The collation request device 200 includes a collation request unit 201, an evaluation value generation unit 202, and a collation data generation unit 203. The collation request unit 201 receives authentication target data to be collated with authentication data as input and sends a collation request to the data collation device 400. The evaluation value generation unit 202 employs the authentication target data and information for collation received from the data collation device 400 as input, and generates an encryption evaluation value. The collation data generation unit 203 employs the encryption evaluation value as input, and generates data for collation.

The data collation device 400 includes a collation information sending unit 401, a collation assist request unit 402, and a determination unit 403. The collation information sending unit 401 receives the collation request sent from the collation request device 200 as input, and sends the information for collation. The collation assist request unit 402 receives the data for collation sent from the collation request device 200 as input, and outputs a collation assist request to the collation assist device 500. The determination unit 403 receives result data output by the collation assist device 500 with respect to the collation assist request as input, and generates and outputs a collation result.

The collation assist device 500 has a key generation unit 501 and a collation assist unit 502. The key generation unit 501 generates a public key and a secret key of additive homomorphism encryption, opens the public key, and stores the secret key. The collation assist unit 502 employs the collation assist request output by the data collation device 400 and the secret key as input, and outputs result data.

Next, an operation of the collation system according to the present exemplary embodiment will be described in detail with reference to the drawings.

The operation of the collation system is classified into two phases of a data registration phase and a ciphertext collation phase. In the data registration phase, authentication data is input to the registration data generation device 100, is encrypted, and is registered in the storage device 300. On the other hand, in the ciphertext collation phase, the authentication target data input to the collation request device 200 is being kept secret and it is determined whether the authentication target data is approximate to (that is, the Euclid distance is short) the plaintext of the encrypted data stored in the storage device 300.

Hereinafter, an operation in each phase will be described in detail.

[Data Registration Phase]

Figure 6:
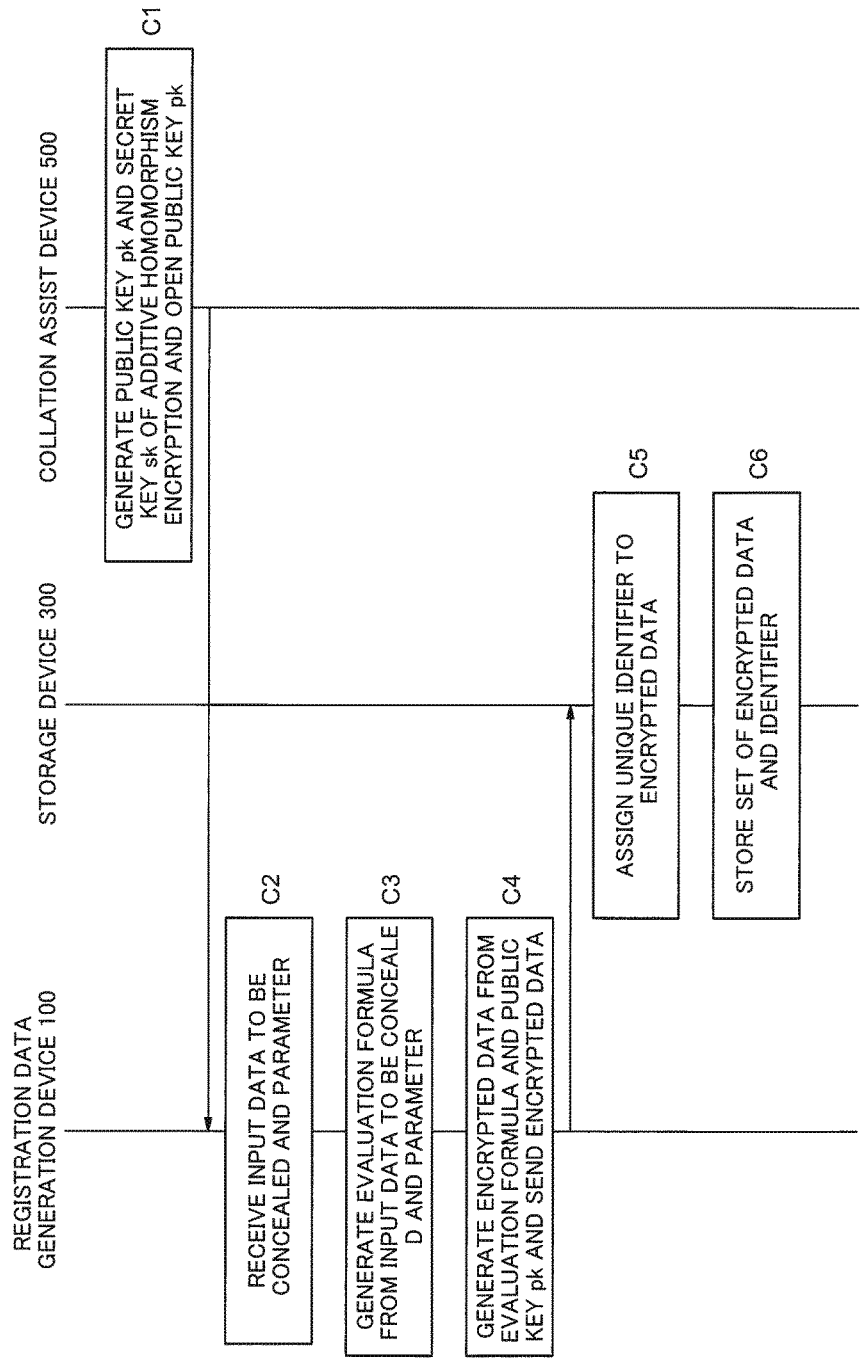
FIG. 6 is a sequence diagram illustrating a data registration operation of a collation system according to a third exemplary embodiment as an example.

FIG. 6 is a sequence diagram illustrating an operation in the data registration phase of the collation system according to the present exemplary embodiment as an example.

Referring to FIG. 6, the key generation unit 501 of the collation assist device 500 generates the public key and the secret key of additive homomorphism encryption and opens the public key (step C1).

Next, the registration data generation device 100 receives authentication data to be concealed, the public key generated by the key generation unit 501, and the parameter (step C2).

Next, the evaluation formula generation unit 101 of the registration data generation device 100 generates an evaluation formula from the input authentication data and parameter (step C3). Next, the encryption unit 102 of the registration data generation device 100 generates encrypted data from the evaluation formula and the public key, and sends the encrypted data to the storage device 300 (step C4).

When the encrypted data is received, the identifier management unit 302 of the storage device 300 assigns a unique identifier to the encrypted data (step C5). Furthermore, the identifier management unit 302 stores a set of the encrypted data and the identifier in the storage unit 301 (step C6).

[Ciphertext Collation Phase]

FIG. 7 is a sequence diagram illustrating an operation in the ciphertext collation phase of the collation system according to the present exemplary embodiment as an example.

Referring to FIG. 7, the collation request unit 201 of the collation request device 200 receives the authentication target data and outputs a collation request (step D1).

When the identifier and the collation request are received, the collation information sending unit 401 of the data collation device 400 receives encrypted data corresponding to the identifier from the storage device 300 (step D2), and outputs information for collation (step D3).

When the information for collation is received, the evaluation value generation unit 202 of the collation request device 200 calculates an evaluation formula and outputs an encryption evaluation value (step D4).

When the encryption evaluation value and the information for collation are received, the collation data generation unit 203 generates data for collation and outputs the data for collation to the data collation device 400 (step D5).

When the data for collation is received, the collation assist request unit 402 of the data collation device 400 generates a collation assist request and outputs the collation assist request to the collation assist device 500 (step D6).

The collation assist unit 502 of the collation assist device 500 employs the collation assist request and the secret key as input, generates result data, and outputs the result data to the data collation device 400 (step D7).

When the result data is received, the determination unit 403 of the data collation device 400 generates and outputs a determination result (step D8).

In the collation system according to the present exemplary embodiment, the registration data generation device 100 generates information regarding an evaluation formula required in collation, instead of registering data or a ciphertext of the data, and registers the information in the storage device 300 during data registration. In accordance with the collation system, it is possible to reduce the processing load of the data collation device 400 and the collation assist device 500 constituting an authentication side node as compared with the processing load of a server disclosed in Non-Patent Literature 1.

Exemplary Embodiment 4

Next, a collation system according to a fourth exemplary embodiment will be described in detail with reference to the drawings.

In the present exemplary embodiment, in the collation system according to the third exemplary embodiment, a one-dimensional Euclid distance is used as a distance. That is, when a distance d $(D,D')=(D-D')^{\{2\}}$ between authentication data D and authentication target data D' is equal to or less than a threshold value d, it is determined that the authentication data D and the authentication target data D' have matched with each other. On the other hand, when the distance d $(D,D')=(D-D')^{\{2\}}$ is larger than the threshold value d, it is determined that the authentication data D and the authentication target data D' do not match with each other. Furthermore, in the present exemplary embodiment, additive homomorphism encryption (for example, Paillier encryption and the like) is used. Hereinafter, an operation in each phase will be described in detail with reference to FIG. 6 and FIG. 7.

[Data Registration Phase]

Referring to FIG. 6, the key generation unit 501 of the collation assist device 500 generates a public key pk and a secret key sk of additive homomorphism encryption and opens the public key pk (step C1).

Next, the registration data generation device 100 receives authentication data D to be concealed, and the public key pk generated by the key generation unit 501 (step C2).

Next, the evaluation formula generation unit 101 of the registration data generation device 100 randomly generates a polynomial F(x), which is equal to 0 when $(D-x)^2=0$, 1, . . . , d and is not equal to 0 in other cases, from the input authentication data D and a parameter d (step C3).

For example, since $F(x)=(D-x)^2 \cdot (D-x)^2-1) \cdot ((D-x)^2-2)$ . . . $((D-x)^2-d)$ is a polynomial of the 2d+2 degree, F(x) is equal to 0 when $(D-x)^2=0$, 1, . . . , d and is not equal to 0 in other cases. For the purpose of simplification, it is assumed that $F(x)=\alpha[N]x^{\{N\}}+\alpha[N-1]x^{\{N-1\}}+ \ldots +\alpha[0]$. In the aforementioned example, since F(x) is the polynomial of the 2d+2 degree, N=2d+1.

Next, the encryption unit 102 employs the public key pk and the coefficients of the polynomial F(x) as input, generates encrypted data C={Enc(pk, $\alpha[0]$), Enc(pk, $\alpha[1]$), . . . , Enc(pk, $\alpha[N]$)}, and sends the encrypted data to the storage device 300 (step C4).

When the encrypted data is received, the identifier management unit 302 of the storage device 300 assigns a unique identifier ID to the encrypted data (step C5). Furthermore, the identifier management unit 302 stores a set (C,ID) of the encrypted data and the identifier in the storage unit 301 (step C6).

[Ciphertext Collation Phase]

Referring to FIG. 7, the data collation device 400 receives the set (C,ID) of the encrypted data stored in the storage unit 301 and the identifier corresponding to the encrypted data (step D2).

Next, the collation request unit 201 of the collation request device 200 receives the authentication target data D' and the public key pk (step D1).

When the authentication target data D' and the public key pk are received, the collation request unit 201 of the collation request device 200 generates a collation request req and outputs the collation request req to the data collation device 400 (step D1). The collation request req is a message requesting collation.

Herein, the data collation device 400 receives the set of the encrypted data and the identifier (step D2). It will be appreciated that the collation request req includes the identifier ID and the data collation device 400 may also be configured to receive a ciphertext C corresponding to the identifier ID from the storage device 30.

When the collation request is received, the collation information sending unit 401 of the data collation device 400 outputs information C for collation to the collation request device 200 (step D3). In the present exemplary embodiment, the information for collation is assumed to be registered encrypted data C. It will be appreciated that the information for collation may also include necessary information (for example, a session ID and the like) in addition to the encrypted data C.

When the information C for collation is received, the evaluation value generation unit 202 of the collation request device 200 calculates an encryption evaluation value as follows (step D4).

1. The evaluation value generation unit 202 sets V=Enc $(pk,\alpha[N])^{\{D'^{\{N\}}\}} \cdot Enc(pk, \alpha[N-1])^{\{D'^{\{N-1\}}\}}$ . . . Enc(pk, $\alpha[0]$).

2. The evaluation value generation unit 202 selects a random number r and sets res=$V^{\{r\}}$.

When the encryption evaluation value res and the information for collation are received, the collation data generation unit 203 generates data res for collation and outputs the data res for collation to the data collation device 400 (step D5).

Herein, the data for collation is the encryption evaluation value res calculated in step D4. It will be appreciated that the data for collation may also include necessary information (for example, a session ID and the like) in addition to the encryption evaluation value res.

Furthermore, step D4 is performed in order to allow output when d(D,D')<d to be randomly performed. When it is not necessary to allow the output to be randomly performed, step D4 may also be omitted.

When the data res for collation and the secret key sk are received, the collation assist request unit 402 of the data collation device 400 outputs the collation assist request res to the collation assist device 500 (step D6).

Herein, the collation assist request is the encryption evaluation value res. It will be appreciated that the collation assist request may also include necessary information (for example, a session ID, a request date and the like) in addition to the encryption evaluation value res.

The collation assist unit 502 of the collation assist device 500 employs the collation assist request res and the secret key sk as input, decrypts res, and outputs a decryption result to the data collation device 400 as result data RESULT (step D7).

The determination unit 44 employs the result data RESULT as input, determines that d(D,D')≤d if RESULT=0, and determines that d(D,D')>d in other cases (step D8).

In the present exemplary embodiment, data registered in the storage device 300 is encrypted data. Furthermore, all data sent from the collation request device 200 in the collation phase is a ciphertext. Consequently, information regarding the registered authentication data D and the authentication target data D' is not absolutely leaked to the storage device 300 and the data collation device 400.

Furthermore, in the present exemplary embodiment, an example of a one-dimensional Euclid distance has been described. However, the polynomial F(x) is changed, so that the present invention can also be easily applied to a two or more-dimensional Euclid distance.

Moreover, the present invention can also be easily applied to the case in which the authentication data D includes a plurality of elements. For example, in the case in which D=(Dx,Dy) and it is determined whether $d(Dx,Dx') \leq dx$ and $d(Dy,Dy') \leq dy$, it is sufficient if a polynomial f(x) is set to 0 when x satisfies $d(Dx,x) \leq dx$ and is set not to 0 in other cases, and a polynomial g(y) is set to 0 when y satisfies $d(Dy,y) \leq dy$ and is set not to 0 in other cases, so that $F(x,y)=f(x)+g(y)$.

In the collation system according to the present exemplary embodiment, the registration data generation device 100 (included in the authentication side target node) generates information regarding an evaluation value required in collation, other than data or a ciphertext of the data, and registers the information in the storage device 300 (included in the authentication side node) during data registration. In accordance with the collation system, it is possible to reduce the processing load of the data collation device 400 and the collation assist device 500 (included in the authentication side node) as compared with the processing load of a server disclosed in Non-Patent Literature 1.

The collation system according to the aforementioned exemplary embodiment, as an example, can be applied to biometric authentication using a minutia including a type, a two-dimensional coordinate, and an angle as elements. In detail, input data in the data registration phase and input data in the ciphertext collation phase are used as biometric information (a minutia) acquired from a fingerprint, a vein and the like. In this way, while the biometric information is being kept secret, it is possible to determine whether encrypted biometric data stored in a storage device and encrypted biometric data created from a collation request device have been obtained from the same person. The determination is processed by whether Euclid distances of two pieces of input data are equal to or less than a constant number. Particularly, the biometric information has been known that the same data is not able to be always stably acquired. On the other hand, it can be assumed that data acquired from the same person is similar (it is possible to acquire data in which Euclid distances of each element are short). Consequently, the collation system according to the aforementioned exemplary embodiment can be preferably applied to biometric authentication.

In addition, the entire disclosure contents of the aforementioned Patent Literature and Non-Patent Literature are incorporated herein by reference. In a frame of the entire disclosure (including the appended claims) of the present invention, modification and adjustment of the exemplary embodiment are further possible based on the basic technical scope thereof. Furthermore, in the frame of the entire disclosure of the present invention, various combinations and selections of various disclosure elements (including each element of each claim, each element of each exemplary embodiment, each element of each drawing, and the like) are possible. That is, it is of course that the present invention includes various modifications and corrections which can be obtained by those skilled in the art according to the entire disclosure including the appended claims and the technical scope. Particularly, for a numerical value range disclosed herein, it should be noted that an arbitrary numerical value or a small range included in the range has been disclosed in detail even though there is no particular mention.

In addition, in the present invention, the following exemplary embodiments are possible.

Exemplary Embodiment 1

It is a collation system according to the aforementioned first aspect.

Exemplary Embodiment 2

The collation system according to the exemplary embodiment 1, the encryption unit performs encryption based on an encryption scheme having additive homomorphism.

Exemplary Embodiment 3

The collation system according to the exemplary embodiment 2, the encryption unit performs encryption based on Paillier encryption.

Exemplary Embodiment 4

The collation system according to any one of exemplary embodiments 1 to 3, the collation information generation unit generates, as the polynomial, a polynomial having a value of 0 when a distance between an independent variable and the authentication data is within the threshold value.

Exemplary Embodiment 5

The collation system according to exemplary embodiment 4, when the polynomial is a polynomial of the $N^{th}$ degree in which an coefficient of an $i^{th}$ term is $\alpha[i](i=0, 1, \ldots, N)$, the encryption unit encrypts a coefficient $\alpha[i]$ by the public key to obtain an encrypted coefficient C[i] and transmits the encrypted coefficient C[i] to a third node, and when the authentication target data D' is received, the evaluation value generation unit acquires the encrypted coefficient C[i] from the third node and generates $C[N]^{\{D'^N\}} \cdot C[N-1]^{\{D'^{\{N-1\}}\}} \ldots C[1]^{D'} \cdot C[0]$ as the evaluation value.

Exemplary Embodiment 6

The collation system according to Exemplary embodiment 5 or 6, the collation unit collates the authentication target data with the authentication data based on whether a value obtained by decrypting the evaluation value by using the secret key is 0.

Exemplary Embodiment 7

The collation system according to any one of exemplary embodiments 4 to 6, the authentication data and the authentication target data include an n-dimensional element, and the evaluation value generation unit generates a polynomial, which has a value of 0 when an n-dimensional Euclid distance between the authentication target data and the authentication data is within a predetermined distance, as the evaluation formula.

Exemplary Embodiment 8

The collation system according to any one of exemplary embodiments 1 to 6, wherein the authentication data and the authentication target data include a plurality of elements, and the evaluation value generation unit obtains polynomials, which have a value of 0 when a distance between the authentication target data and the authentication data is within a predetermined distance, with respect to the plurality of elements, and generates sum of the polynomials obtained with respect to the plurality of elements as the evaluation formula.

Exemplary Embodiment 9

It is a node according to the aforementioned second aspect.

Exemplary Embodiment 10

The node according to the exemplary embodiment 8, the encryption unit performs encryption based on an encryption scheme having additive homomorphism.

Exemplary Embodiment 11

The node according to the exemplary embodiment 9, the encryption unit performs encryption based on Paillier encryption.

Exemplary Embodiment 12

The node according to any one of the exemplary embodiments 8 to 10, the polynomial is a polynomial having a value of 0 when a distance between an independent variable and the authentication data is within the threshold value.

Exemplary Embodiment 13

The node according to exemplary embodiment 12, when the polynomial is a polynomial of the $N^{th}$ degree in which an coefficient of an $i^{th}$ term is $\alpha[i](i=0, 1, \ldots, N)$, the encryption unit encrypts a coefficient $\alpha[i]$ by the public key to obtain an encrypted coefficient $C[i]$ and transmits the encrypted coefficient $C[i]$ to the third node, and when the authentication target data D' is received, the evaluation value generation unit acquires the encrypted coefficient $C[i]$ from the third node and generates $C[N]^{\{D'^N\}} \cdot C[N-1]^{\{D'^{\{N-1\}}\}} \ldots C[1]^{D'} \cdot C[0]$ as the evaluation value.

Exemplary Embodiment 14

The node according to exemplary embodiment 12 or 13, the authentication data and the authentication target data include an n-dimensional element, and the evaluation value generation unit generates a polynomial, which has a value of 0 when an n-dimensional Euclid distance between the authentication target data and the authentication data is within a predetermined distance, as the evaluation formula.

Exemplary Embodiment 15

The node according to any one of exemplary embodiments 9 to 14, wherein the authentication data and the authentication target data include a plurality of elements, and the evaluation value generation unit obtains polynomials, which have a value of 0 when a distance between the authentication target data and the authentication data is within a predetermined distance, with respect to the plurality of elements, and generates sum of the polynomials obtained with respect to the plurality of elements as the evaluation formula.

Exemplary Embodiment 16

A collation method of a collation system includes a first node, a second node, and a third node, the collation method includes a step in which the second node generates a pair of a public key and a secret key and transmits the public key to the first node;

a step in which the first node generates an evaluation formula for evaluating a distance with authentication data;

a step in which the first node encrypts coefficients of the evaluation formula by the public key and transmits the encrypted coefficients to the third node;

a step in which the third node holds the encrypted coefficients;

a step in which when authentication target data to be collated with the authentication data is received, the first node acquires the encrypted coefficients from the third node, generates an evaluation value for collating the authentication target data with the authentication data based on the authentication target data and the encrypted coefficients, and transmits the evaluation value to the second node; and a step in which the second node decrypts the evaluation value by using the secret key, thereby collating the authentication target data with the authentication data.

Exemplary Embodiment 17

It is the collation method according to the aforementioned third aspect.

Exemplary Embodiment 18

The collation method according to the exemplary embodiment 17, the first node performs encryption based on an encryption scheme having additive homomorphism.

Exemplary Embodiment 19

The collation method according to the exemplary embodiment 18, the first node performs encryption based on Paillier encryption.

Exemplary Embodiment 20

The collation method according to any one of exemplary embodiments 17 to 19, the first node generates, as the polynomial, a polynomial having a value of 0 when a distance between an independent variable and the authentication data is within the threshold value.

Exemplary Embodiment 21

The collation method according to exemplary embodiment 20, when the polynomial is a polynomial of the $N^{th}$ degree in which an coefficient of an $i^{th}$ term is $\alpha[i](i=0, 1, \ldots, N)$, the first node encrypts a coefficient $\alpha[i]$ by the public key to obtain an encrypted coefficient $C[i]$ and transmits the encrypted coefficient $C[i]$ to the third node, and when the authentication target data D' is received, the evaluation value generation unit acquires the encrypted coefficient C[i] from the third node and generates $C[N]^{\{D'^N\}} \cdot C[N-1]^{\{D'^{\{N-1\}}\}} \ldots C[1]^{D'} \cdot C[0]$ as the evaluation value.

Exemplary Embodiment 22

The collation method according to exemplary embodiment 20 or 21, the authentication data and the authentication target data include an n-dimensional element, and the first node generates a polynomial, which has a value of 0 when an n-dimensional Euclid distance between the authentication target data and the authentication data is within a predetermined distance, as the evaluation formula.

Exemplary Embodiment 23

The collation method according to any one of exemplary embodiments 17 to 22, wherein the authentication data and the authentication target data include a plurality of elements, and the first node obtains polynomials, which have a value of 0 when a distance between the authentication target data and the authentication data is within a predetermined distance, with respect to the plurality of elements, and generates sum of the polynomials obtained with respect to the plurality of elements as the evaluation formula.

Exemplary Embodiment 24

It is a program according to the aforementioned fourth aspect.

Exemplary Embodiment 25

The program according to the exemplary embodiment 24, wherein the program causes the computer to execute:
a process of performing encryption based on an encryption scheme having additive homomorphism Exemplary Embodiment 26

The program according to the exemplary embodiment 25, wherein the program causes the computer to execute:
a process of performing encryption based on Paillier encryption Exemplary Embodiment 27

The program according to any one of exemplary embodiments 24 to 26, wherein the program causes the computer to execute:
a process of generating, as the polynomial, a polynomial having a value of 0 when a distance between an independent variable and the authentication data is within the threshold value.

Exemplary Embodiment 28

The program according to the exemplary embodiment 27, wherein the program causes the computer to execute:
a process of encrypting a coefficient $\alpha[i]$ by the public key to obtain an encrypted coefficient C[i] when the polynomial is a polynomial of the $N^{th}$ degree in which an coefficient of an $i^{th}$ term is $\alpha[i](i=0, 1, \ldots, N)$, and transmitting the encrypted coefficient C[i] to the third node; and
a process of acquiring the encrypted coefficient C[i] from the third node when the authentication target data D' is received, and generating $C[N]^{\{D'^N\}} \cdot C[N-1]^{\{D'^{\{N-1\}}\}} \ldots C[1]^{D'} \cdot C[0]$ as the evaluation value.

Exemplary Embodiment 29

The program according to the exemplary embodiment 27 or 28, wherein the authentication data and the authentication target data include an n-dimensional element, and
the program causes the computer to execute:
a process of generating a polynomial, which has a value of 0 when an n-dimensional Euclid distance between the authentication target data and the authentication data is within a predetermined distance, as the evaluation formula.

Exemplary Embodiment 30

The program according to any one of the exemplary embodiments 24 to 29, wherein the authentication data and the authentication target data include a plurality of elements, and
the program causes the computer to execute:
a process of obtaining polynomials, which have a value of 0 when a distance between the authentication target data and the authentication data is within a predetermined distance, with respect to the plurality of elements, and generating the sum of the polynomials obtained with respect to the plurality of elements as the evaluation formula.

REFERENCE SIGNS LIST 10,100 registration data generation device
11,101 evaluation formula generation unit
12,102 encryption unit
20,200 collation request device
21,201 collation request unit
22,202 evaluation value generation unit
23,203 collation data generation unit
30,300 storage device
31,301 storage unit
32,302 identifier management unit
40,400 data collation device
41 key generation unit
42,401 collation information sending unit
43 result generation unit
44,403 determination unit
46 collation unit
110,120,130 node
402 collation assist request unit
500 collation assist device
501 key generation unit
502 collation assist unit

The invention claimed is:

1. A collation system comprising:
a first node that is a first authenticated side node;
a second node that is a second authentication side node; and
a third node that is a third authentication side node,
the first node, as the first authenticated side node, including:
an evaluation formula generation unit that generates a polynomial as an evaluation formula, the polynomial equaling to zero when a distance with authentication data is within a predetermined distance, and the polynomial not equaling to zero when the distance is outside a predetermined distance;
an encryption unit that encrypts, based on an encryption scheme with additive homomorphism, coefficients of the evaluation formula by a public key and transmits the encrypted coefficients to the third node; and an evaluation value generation unit that acquires the encrypted coefficients from the third node when authentication target data to be collated with the authentication data is received, generates an evaluation value for collating the authentication target data with the authentication data based on the authentication target data and the encrypted coefficients, and transmits the evaluation value to the second node, the second node, as the second authentication side node, including:

a key generation unit that generates a pair of the public key and a secret key and transmits the public key to the first node; and a collation unit that decrypts the evaluation value by using the secret key, thereby collating the authentication target data with the authentication data, and the third node, as the third authentication side node, including:

a storage that holds the encrypted coefficients.

2. The collation system according to claim 1, wherein, when the polynomial is a polynomial of the $N^{th}$ degree in which a coefficient of an $i^{th}$ term is $\alpha[i](i=0, 1, \ldots, N)$, the encryption unit encrypts a coefficient $\alpha[i]$ by the public key to obtain an encrypted coefficient $C[i]$ and transmits the encrypted coefficient $C[i]$ to the third node, and when the authentication target data D' is received, the evaluation value generation unit acquires the encrypted coefficient $C[i]$ from the third node and generates $C[N]^{[D'^N]} \cdot C[N-1]^{\{D'^{\{N-1\}}\}} \ldots C[1]^{D'} \cdot C[0]$ as the evaluation value.

3. The collation system according to claim 2, wherein the collation unit collates the authentication target data with the authentication data based on whether a value obtained by decrypting the evaluation value by using the secret key is 0.

4. The collation system according to claim 2, wherein the authentication data and the authentication target data include an n-dimensional element, and the evaluation value generation unit generates a polynomial, which has a value of 0 when an n-dimensional Euclid distance between the authentication target data and the authentication data is within the predetermined distance, as the evaluation formula.

5. The collation system according to claim 2, wherein, the authentication data and the authentication target data include a plurality of elements, and the evaluation value generation unit obtains polynomials, which have a value of 0 when a distance between the authentication target data and the authentication data is within the predetermined distance, with respect to the plurality of elements, and generates sum of the polynomials obtained with respect to the plurality of elements as the evaluation formula.

6. The collation system according to claim 1, wherein the collation unit collates the authentication target data with the authentication data based on whether a value obtained by decrypting the evaluation value by using the secret key is 0.

7. The collation system according to claim 6, wherein the authentication data and the authentication target data include an n-dimensional element, and the evaluation value generation unit generates a polynomial, which has a value of 0 when an n-dimensional Euclid distance between the authentication target data and the authentication data is within the predetermined distance, as the evaluation formula.

8. The collation system according to claim 6, wherein, the authentication data and the authentication target data include a plurality of elements, and the evaluation value generation unit obtains polynomials, which have a value of 0 when a distance between the authentication target data and the authentication data is within the predetermined distance, with respect to the plurality of elements, and generates sum of the polynomials obtained with respect to the plurality of elements as the evaluation formula.

9. The collation system according to claim 1, wherein, the authentication data and the authentication target data include an n-dimensional element, and the evaluation value generation unit generates the polynomial, which has a value of 0 when an n-dimensional Euclid distance between the authentication target data and the authentication data is within the predetermined distance, as the evaluation formula.

10. The collation system according to claim 9, wherein the authentication data and the authentication target data include a plurality of elements, and the evaluation value generation unit obtains polynomials, which have a value of 0 when a distance between the authentication target data and the authentication data is within the predetermined distance, with respect to the plurality of elements, and generates sum of the polynomials obtained with respect to the plurality of elements as the evaluation formula.

11. The collation system according to claim 1, wherein the authentication data and the authentication target data include a plurality of elements, and the evaluation value generation unit obtains polynomials, which have a value of 0 when a distance between the authentication target data and the authentication data is within the predetermined distance, with respect to the plurality of elements, and generates sum of the polynomials obtained with respect to the plurality of elements as the evaluation formula.

12. An authenticated side node comprising:

an evaluation formula generation unit that generates a polynomial as an evaluation formula, the polynomial equaling to zero when a distance with authentication data is within a predetermined distance, and the polynomial not equaling to zero when the distance is outside a predetermined distance;

an encryption unit that encrypts, based on an encryption scheme with additive homomorphism, coefficients of the evaluation formula by a public key received from a second authenticated side node that generates a pair of the public key and a secret key, and transmits the encrypted coefficients to a third authenticated side node; and an evaluation value generation unit that acquires the encrypted coefficients from the third authenticated side node when authentication target data to be collated with the authentication data is received, generates an evaluation value for collating the authentication target data with the authentication data based on the authentication target data and the encrypted coefficients, and transmits the evaluation value to the second authenticated side node.

13. A collation method comprising:

generating, in a first authenticated side node, a polynomial as an evaluation formula, the polynomial equaling to zero when a distance with authentication data is within a predetermined distance, and the polynomial not equaling to zero when the distance is outside a predetermined distance;

encrypting, based on an encryption scheme with additive homomorphism, in the first authenticated side node, coefficients of the evaluation formula by a public key received from a second authenticated side node that generates a pair of the public key and a secret key, and transmitting transmits the encrypted coefficients to a third authenticated side node;

acquiring, in the first authenticated side node, the encrypted coefficients from the third authenticated side node when authentication target data to be collated with the authentication data is received, and generating, in the first authenticated side node, an evaluation value for collating the authentication target data with the authentication data based on the authentication target data and the encrypted coefficients; and transmitting, in the first authenticated side node, the evaluation value to the second authenticated side node.

14. A non-transitory computer readable medium storing a program causing a computer in a first authenticated side node to execute:

a process of generating a polynomial as an evaluation formula, the polynomial equaling to zero when a distance with authentication data is within a predetermined distance, and the polynomial not equaling to zero when the distance is outside a predetermined distance;

a process of encrypting, based on an encryption scheme with additive homomorphism, coefficients of the evaluation formula by a public key received from a second authenticated side node that generates a pair of the public key and a secret key, and transmitting the encrypted coefficients to a third authenticated side node;

a process of acquiring the encrypted coefficients from the third authenticated side node when authentication target data to be collated with the authentication data is received, and generating an evaluation value for collating the authentication target data with the authentication data based on the authentication target data and the encrypted coefficients; and a process of transmitting the evaluation value to the second authenticated side node.

\* \* \* \* \*